United States Patent
Sardar et al.

(10) Patent No.: US 10,489,729 B2
(45) Date of Patent: Nov. 26, 2019

(54) TASK SCHEDULING ASSISTANCE

(71) Applicant: Tata Consultancy Services Limited, Mumbai (IN)

(72) Inventors: Gautam Abhay Kumar Sardar, Cincinnati, OH (US); Jeffrey Tew, Loveland, OH (US); Devadatta Madhukar Kulkarni, Rochester Hills, MI (US)

(73) Assignee: Tata Consultancy Services Limited, Mumbai (IN)

( * ) Notice: Subject to any disclaimer, the term of this patent is extended or adjusted under 35 U.S.C. 154(b) by 324 days.

(21) Appl. No.: 14/748,562

(22) Filed: Jun. 24, 2015

(65) Prior Publication Data

US 2015/0371177 A1 Dec. 24, 2015

(30) Foreign Application Priority Data

Jun. 24, 2014 (IN) .......................... 2039/MUM/2014

(51) Int. Cl.
*G06Q 10/06* (2012.01)
(52) U.S. Cl.
CPC ............................ *G06Q 10/063118* (2013.01)
(58) Field of Classification Search
None
See application file for complete search history.

(56) References Cited

U.S. PATENT DOCUMENTS 5,671,361 A 9/1997 Brown et al.
8,225,319 B2 * 7/2012 Laithwaite ............. G06Q 10/06
718/102

(Continued)

FOREIGN PATENT DOCUMENTS

WO WO-0116838 A2 * 3/2001 ............. G06Q 10/06
WO WO-2009026570 A1 * 2/2009 ..... G06Q 10/063118

(Continued)

OTHER PUBLICATIONS

Danilovic, Mike, and Bengt Sandkull. "The use of dependence structure matrix and domain mapping matrix in managing uncertainty in multiple project situations." International journal of project management 23.3 (2005): 193-203.*

(Continued)

*Primary Examiner* — Thomas L Mansfield
*Assistant Examiner* — Derick J Holzmacher
(74) *Attorney, Agent, or Firm* — Schwegman Lundberg & Woessner, P.A.

(57) ABSTRACT

Methods and systems for providing assistance in scheduling a plurality of tasks pertaining to a project are described. The method may include obtaining information pertaining to each of the plurality of tasks associated with the project for scheduling execution of the plurality of tasks. Further, the method may include computing a certainty index and a controllability index for each of the plurality of tasks. The certainty index and the controllability index is computed based on corresponding certainty scores and controllability scores determined for each of the plurality of tasks. The method also includes distributing the plurality of tasks into quadrants based on a threshold value determined for the certainty index and the controllability index. In addition, the method may include generating a sequence of execution of the plurality of tasks of the project based on the division of the tasks.

8 Claims, 5 Drawing Sheets

(56) References Cited

U.S. PATENT DOCUMENTS

| | | | |
|---|---|---|---|
| 8,316,371 B2 | 11/2012 | Chaffee et al. | |
| 2002/0091747 A1* | 7/2002 | Rehg | G06F 9/5066 718/107 |
| 2002/0091748 A1* | 7/2002 | Rehg | G06N 20/00 718/107 |
| 2007/0050771 A1* | 3/2007 | Howland | G06F 9/4825 718/102 |
| 2007/0094281 A1* | 4/2007 | Malloy | G06Q 10/06 |
| 2008/0244584 A1* | 10/2008 | Smith | G06F 9/4881 718/102 |
| 2008/0244605 A1* | 10/2008 | Bennington | G06Q 10/06 705/7.14 |
| 2009/0119144 A1* | 5/2009 | Goyal | G06Q 10/06 705/7.12 |
| 2009/0133027 A1* | 5/2009 | Gunning | G06Q 10/06 718/103 |
| 2009/0192859 A1* | 7/2009 | Akatsu | G06Q 10/06 705/7.13 |
| 2010/0077327 A1* | 3/2010 | Pulsipher | G06F 9/453 715/764 |
| 2011/0010214 A1* | 1/2011 | Carruth | G06Q 10/06 705/7.26 |
| 2011/0066466 A1* | 3/2011 | Narayanan | G06Q 10/06 705/7.36 |
| 2013/0326537 A1* | 12/2013 | Edelstein | G06F 9/4881 718/106 |
| 2014/0310047 A1* | 10/2014 | De | G06Q 10/103 705/7.21 |

FOREIGN PATENT DOCUMENTS

| | | | |
|---|---|---|---|
| WO | WO-2009055425 A1 * | 4/2009 | G06Q 10/06 |
| WO | WO-2010033348 A2 * | 3/2010 | G06Q 10/10 |

OTHER PUBLICATIONS

Huang, Enzhen, and Shi-Jie Chen. "Estimation of project completion time and factors analysis for concurrent engineering project management: a simulation approach." Concurrent Engineering 14.4 (2006): 329-341.*

Raz, Tzvi, and E. Michael. "Use and benefits of tools for project risk management." International journal of project management 19.1 (2001): 9-17.*

Burckhardt, Sebastian, Alexandro Baldassin, and Daan Leijen. "Concurrent programming with revisions and isolation types." ACM Sigplan Notices. vol. 45. No. 10. ACM, 2010. (Year: 2010).*

Kulkarni, Milind, et al. "Optimistic parallelism requires abstractions." ACM SIGPLAN Notices 42.6 (2007): 211-222 (Year: 2007).*

Cori, K. A. (1985).Fundamentals of master scheduling for the project manager: complementary aspects of project control. Project Management Journal, 16(2),78-89. (Year: 1985).*

Danilovic, Mike, and Bengt Sandkull. "The use of dependence structure matrix and domain mapping matrix in managing uncertainty in multiple project situations." International journal of project management 23.3 (2005): 193-203. (Year: 2005).*

Huang, Enzhen, and Shi-Jie Chen. "Estimation of project completion time and factors analysis for concurrent engineering project management: a simulation approach." Concurrent Engineering 14.4 (2006): 329-341. (Year: 2006).*

Raz, Tzvi, and E. Michael. "Use and benefits of tools for project risk management." International journal of project management 19.1 (2001): 9-17. (Year: 2001).*

* cited by examiner

TASK SCHEDULING ASSISTANCE

CLAIM OF PRIORITY

This application claims the benefit of priority of India Patent Application Serial No. 2039/MUM/2014, filed on 24 Jun. 2014, the benefit of priority of which is claimed hereby, and which is incorporated by reference herein in its entirety.

TECHNICAL FIELD

The present subject matter relates, in general, to project management and, particularly but not exclusively, to providing assistance in scheduling of tasks in projects.

BACKGROUND

Generally, organizations handle a large number of projects simultaneously. As is generally understood, a project is a temporary group activity including a number of tasks for producing a product, service or result with a pre-defined beginning and a pre-defined end. There may be scenarios that a project may be associated with a number of constraints, which may affect the overall completion of the project. Such constraints may include, but are not limited to scope of work, time deadline, resources to be utilized, financial budget, policies governed by regulatory committees, and quality. As successful completion of the projects may eventually assist in carving a path of growth and development for an organization, organizations invest huge resources for scheduling and managing various tasks associated with multiple projects in order to achieve a favorable outcome.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
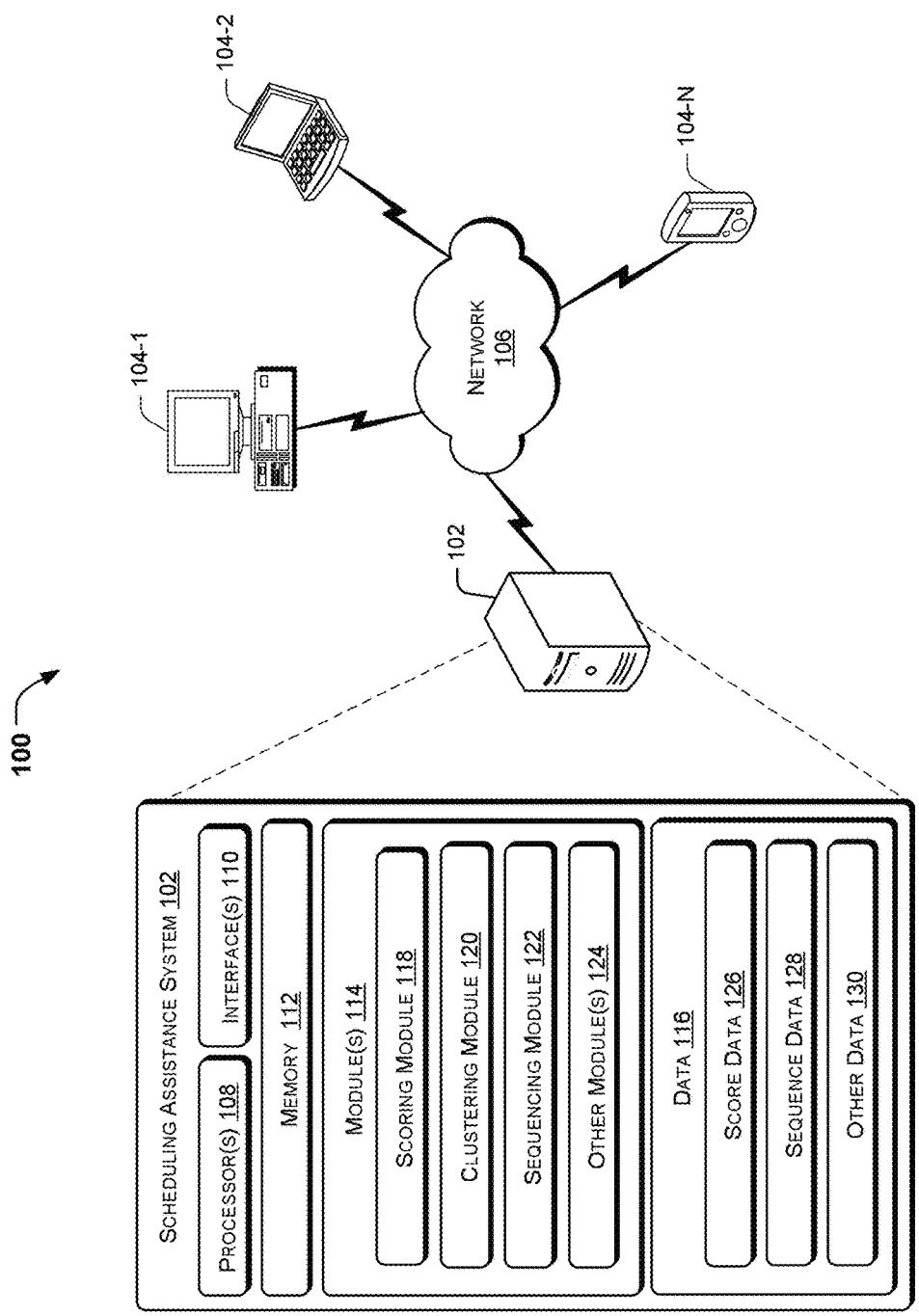
FIG. 1 illustrates a network environment implementing a scheduling assistance system for task scheduling assistance for projects, in accordance with an embodiment of the present subject matter.

System(s) and method(s) for providing assistance in scheduling of tasks in projects are described. The system(s) and method(s) can be implemented in a variety of computing devices, such as laptops, desktops, workstations, tablet-PCs, notebooks, portable computers, tablet computers, internet appliances, and similar systems. However, a person skilled in the art will comprehend that the embodiments of the present subject matter are not limited to any particular computing system, architecture, or application device, as they may be adapted to new computing systems and platforms as they become available.

In the last few decades, a prominent impact of commercialization is evident across the globe. Owing to the worldwide commercialization, organizations are facing a cutthroat competition in the market. In order to establish and maintain a position in the competitive industry, organizations are investing heavily in their resources to ensure that projects can be successfully completed with favorable outcomes. As would be understood, successful completion of projects may directly reflect in an overall growth and development of an organization.

Usually, a project may include a plurality of tasks to be completed to ensure an overall completion of the project. Such tasks may be understood as various stages to be completed during the course of completion of the overall project. Generally, tasks of a project may be related to each other. In other words, there may exist a relationship among various tasks of a project. For example, a task B may not be started until a task A is completed. Similarly, a completion status of the task B may affect a completion status of a task C. Conventional techniques of program management does not take into account such relationships for scheduling tasks of a project. Neglecting relationships among the tasks for task scheduling may lead to an incomplete analysis and therefore, an overall outcome of the project management may be inaccurate.

Further, the conventional techniques may involve human intervention at each step for scheduling tasks in a project. For example, a team leader may identify project tasks, assign resources to the tasks, and develop a task execution sequence. Therefore, such techniques rely on the diligence and a skill set of an individual, and an output of scheduling may vary depending on the quality and experience level of the individual. Also, where a project includes a large number of tasks it may become difficult for an individual to plan and schedule tasks pertaining to the project in a timely and effective manner.

Moreover, many a times during the lifetime of a project, dynamics of the project may change. In order to accommodate any changes in any of the tasks or factors associated with the project, the task schedule may have to be updated regularly. The conventional techniques generally take a significant amount of efforts, time, and cost to update the task schedule with additional inputs. As is evident, the conventional project management techniques provide a time-extensive, inefficient, inaccurate and expensive proposition for scheduling tasks in projects.

According to the present subject matter, a scheduling assistance system, hereinafter referred to as a system, for providing scheduling assistance of tasks in a project is disclosed. In one implementation, a plurality of tasks of a project along with task information pertaining to each task may be obtained. Each task may have information pertaining to at least one task associated with execution of the task for completion of the project. As the name suggests, task information is indicative of details pertaining to a task. In one implementation, the task information may relate to certainty and controllability of the task. A certainty of a task is indicative of availability of information pertaining to execution of the task. On the other hand, a controllability of a task is indicative of a number of factors available to guide the task towards an expected outcome.

In an implementation, based on the certainty and the controllability of the task information, a certainty score and a controllability score may be assigned to each task. The certainty score may be indicative of the amount of details available pertaining to execution of the task based on the task information. Therefore, certainty scores rate a project based on the extent of information available about the project and its dependencies. In other words, the certainty scores capture the ability to make a risk free decision based on the certainty of completing a task in hand. On the other hand, the controllability score may be indicative of the factors available to control the task based on the task information for guiding the project towards an expected outcome. In other words, controllability scores indicate an availability of handles or resources to manage or execute a project. Therefore, the controllability scores measure the ability to complete a project based on the available resources.

Following the allotment of certainty scores and controllability scores to task information, the system may compute a certainty index and a controllability index for each task may be computed. In one implementation, the certainty index may be generated by consolidating certainty scores of one or more task information associated with the task. Similarly, the controllability index for a task may be generated by consolidating controllability scores of one or more associated task information.

Based on the certainty index and the controllability index, the system may generate a certainty-controllability index chart. The certainty-controllability index may be understood as a graph for plotting the plurality of tasks based on corresponding certainty indices and controllability indices. In one implementation, certainty indices can be plotted on abscissa, i.e., X-axis of the graph, and controllability indices can be plotted on ordinate, i.e., Y-axis of the graph.

In one implementation, once the certainty-controllability index chart is generated, the system may distribute the plurality of tasks into one or more clusters based on the certainty indices and the controllability indices. In the present implementation, based on the clusters, the system may define one or more threshold values for the certainty indices and the controllability indices in order to generate quadrants for distribution of the plurality of tasks. In an example, the system may keep initial thresholds as an average of each of the ranges or next integer to them, for instance, for the certainty and controllability scores going from 1 to 5, the threshold value may be set up at 3. Depending upon the nature of the project and preparedness of the team, the system may maintain a fixed threshold value for the certainty indices but the threshold values for the controllability indices may evolve with the life of the project.

It may be noted that the threshold values are driven by an individual owner at their own task level. When the owner get to see the overall project assessments mapped out across all tasks involved, the owner may recalibrate the threshold values relative to interfacing tasks and accordingly the system may suggest threshold values. Based on the suggested threshold values, the system may show overall clusters generating relevant quadrants.

Further, the system may identify relationships among the plurality of tasks on the basis of hard dependencies. A hard dependency is indicative of a dependency, when nature of the work itself dictates an order in which the tasks should be performed. Typically, the hard dependencies may incorporate physical or infrastructure factors, e.g., availability of a specific equipment, associated with the project. Therefore, tasks with physical limitations may be associated with a hard dependency. In one example, contractual limitations may induce hard dependencies, and force a particular sequence of tasks.

Based on the identified relationships, the plurality of tasks may be shuffled among the quadrants. In continuation with the shuffling of the tasks among the quadrants, within each block, the system may generate a sequence for execution of tasks based on the corresponding certainty indices and the controllability indices. Further, the system may consolidate the sequence of execution of the tasks from different blocks to generate a final sequence of execution of plurality of tasks for completion of the project.

Accordingly, the present subject matter involves minimal human intervention. The task scheduling assistance is performed in an automated manner by allotting controllability indices and certainty indices to various tasks of a project. Further, relationships among the plurality of tasks are also considered for scheduling the tasks. This would assist in ensuring a comprehensive and accurate analysis for scheduling the tasks. In an implementation, inclusion of new tasks in the project can also be accommodated in the analysis for revising the task schedule. All the above-mentioned advantages lead to optimum utilization of time and resources, which would facilitate in reducing the cost involved in the task scheduling. Therefore, the system of the present subject matter provides a comprehensive and exhaustive approach for a time-saving, accurate, and inexpensive project management.

These and other advantages of the present subject matter would be described in greater detail in conjunction with the following figures. While aspects of described system(s) and method(s) for automated task scheduling for a project can be implemented in any number of different computing systems, environments, and/or configurations, the embodiments are described in the context of the following exemplary system(s).

FIG. 1 illustrates a network environment 100 implementing a scheduling assistance system 102 for providing assistance in scheduling of tasks in projects, according to an example of the present subject matter. The scheduling assistance system 102 may be implemented as, but is not limited to, desktop computers, hand-held devices, laptops, or other portable computers, tablet computers, and the like. The network environment 100, apart from the scheduling assistance system 102, includes one or more user devices 104-1, 104-2, . . . , 104-N. For the purpose of explanation and clarity, the user devices 104-1, 104-2, . . . , 104-N, are hereinafter collectively referred to as user devices 104 and hereinafter individually referred to a user device 104. In the network environment 100, the scheduling assistance system 102 is connected to the user devices 104 through a network 106.

The network 106 may be a wireless network, wired network, or a combination thereof. The network 106 can be implemented as one of the different types of networks, such as intranet, telecom network, electrical network, local area network (LAN), wide area network (WAN), Virtual Private Network (VPN), internetwork, Global Area Network (GAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network

106 may include a variety of network devices, including routers, bridges, servers, computing devices, and storage devices.

Although the scheduling assistance system 102 and the user devices 104 are shown to be connected through the network 106, it would be appreciated by those skilled in the art that the scheduling assistance system 102 and the user devices 104 may be distributed locally or across one or more geographic locations and can be physically or logically connected to each other.

The scheduling assistance system 102 may be coupled to the user devices 104 to receive inputs from team members regarding the tasks pertaining to a project. In accordance with one embodiment of the present subject matter, the scheduling assistance system 102 implements a plurality of techniques to provide assistance in scheduling of tasks in projects. The implementation and functioning of the scheduling assistance system 102 is as described below.

In one implementation, the scheduling assistance system 102 includes one or more processor(s) 108, interface(s) 110, and a memory 112, coupled to the processor(s) 108. The processor(s) 108 can be a single processing unit or a number of units, all of which could include multiple computing units. The processor(s) 108 may be implemented as one or more microprocessors, microcomputers, microcontrollers, digital signal processors, central processing units, state machines, logic circuitries, and/or any devices that manipulate signals based on operational instructions. Among other capabilities, the processor(s) 108 is configured to fetch and execute computer-readable instructions and data stored in the memory 112.

The interface(s) 110 may include a variety of software and hardware interfaces, for example, interfaces for peripheral device(s), such as a keyboard, a mouse, an external memory, and a printer. The interface(s) 110 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 110 may include one or more ports for connecting the scheduling assistance system 102 to a number of user devices 104. In various example implementations discussed below, the scheduling assistance system 102 communicates with the user devices 104 via the interfaces 110.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The scheduling assistance system 102 includes modules 114 and data 116.

The modules 114, amongst other things, include routines, programs, objects, components, data structures, etc., which perform particular tasks or implement particular abstract data types. The modules 114, includes a scoring module 118, a clustering module 120, a sequencing module 122, and other module(s) 124. The other module(s) 124 may include programs or coded instructions that supplement applications and functions of the scheduling assistance system 102.

On the other hand, the data 116, inter alia serves as a repository for storing data processed, received, and generated by one or more of the modules 114. The data 116 includes, for example, scoring data 126, sequencing data 128, and other data 130. The other data 130 includes data generated as a result of the execution of one or more modules in the other module(s) 114.

In an implementation, the scoring module 118 of the scheduling assistance system 102 may obtain a plurality of tasks pertaining to a project. In an example, the scoring module 118 may retrieve the plurality of tasks from the memory 112. In the present example, the memory 112 may track the tasks that may have been performed during an earlier project. In another example, the scoring module 118 may retrieve the tasks from some library of routines or documents related to the project. In yet another example, the scoring module 118 may be provided with a given set of tasks pertaining to the project or a given set of projects. Based on the given set of the tasks, the scoring module 118 may augment the tasks or projects in a plurality of different ways based on inputs from team or aggregated experience of team members. Each task may include task information pertaining to execution of the tasks, for completion of the project.

Further, the scoring module 118 may obtain the task information for each task pertaining to one or more projects. In one implementation, the scoring module 118 may identify task information for each task of the one or more projects. In an implementation, the scoring module 118 may retrieve the task information from the memory 112. In the present example, the scoring module 118 may leverage various libraries pertaining to earlier projects to determine the task information. In addition, the scoring module 118 may scan earlier projects or library of routines to seek the task information pertaining to the tasks of the one or more projects. For providing a better understanding and clarity of the present subject matter, an example of a project including a plurality of tasks $P_1, \ldots, P_N$ may be considered.

In an implementation, for each task, the scoring module 118 may allot a certainty score and a controllability score to each task information of a task. The certainty score is indicative of amount of details available pertaining to execution of the task based on the task information. On the other hand, the controllability score is indicative of factors available to control the task based on the task information for guiding the project towards an expected outcome. In an example, the task information is associated with an actor or initiator, an action, and an expected result, using some inputs and tools. The actor may act upon receiving some input. For instance, for a task of developing a validation plan for a steel part, the inputs will be set of performance expectations in each of the areas of crash, formability, hardness etc. along with the corresponding quantitative ranges for feasible and infeasible boundaries. Another input for the actor will be set of tests that have to be performed to check each of those aspects and availability of the necessary resources. The output for the expected result may be a sequential map of testing steps using the available resources and then confirming that everything is checked out or reworked based upon the initial outcomes.

The scoring module 118 may allot the certainty score to the task information based upon proportion of readiness of factors, such as inputs, tools, and actors. On the other hand, the scoring module 118 may allot the controllability score based on potential soft dependencies or hard dependencies. For example, for certain task completion, a project may involve resources who may be experts in certain domains, with specific applications. In such situations, finding availability of such a resource is driven by past experience of the resource and understanding of skills across the organization. The availability of the resource is driven by team's influence, overall business, or a push from a resource. Accordingly, the soft dependencies may be understood as knowing, sharing, as well as influencing buy-in through connectivity. On the other hand, the hard dependencies may be understood as having a capable resource, available training tools, or licenses. In an example, the scoring module 118 may store the certainty scores and the controllability scores of the task information as the score data 126.

The soft dependencies are indicative of restrictions outlined by a project manager based on two factors. Firstly, if there are multiple methods of doing an activity, the scoring module 118 may select an efficient method out of the multiple methods. For example, if any two programs can be utilized for performing a task, the scoring module 118 may employ the program which is comparatively more efficient, in terms of time taken for completion of activity and accuracy of result provided. Secondly, if there are multiple task sequences, the scoring module 118 may select a task sequence which offers optimum utilization of resources available for completing the project. Therefore, the soft dependencies involve skill availability or organizational buy-in, in terms of executing a task.

Further, the hard dependencies may be indicative of a dependency, when nature of the work itself dictates an order or sequence in which the tasks should be performed. For example, the hard dependencies may incorporate physical or infrastructure factors, such as availability of a specific equipment or policy adherence, associated with the project.

In one implementation, the scoring module 118 may allot a certainty score and a controllability score to a task information on a scale of 1-5. In one example, the scores of 1, 2, 3, 4 and 5 can be interpreted as "Very low", "Low", "Average", "High" and "Very High", respectively. For example, a task may be "Definition of cross functional information exchange process" and associated task information may include "80% of the stakeholders are outside the implementation leadership team". In the present example, the task information may indicate that there is a lack of information as well as control for execution of the task based on the task information. Further, the scoring module 118 may allot a certainty score of "2" and a controllability score of "1" to the task information.

Table 1 illustrates an example of a project with a plurality of tasks and corresponding task information. Table 1 is provide examples for better clarity and understanding of the present subject matter and therefore, should not be construed as limiting.

TABLE 1

| Charter/ Task ID | Vision Element | Charter/ Task Name | Dependency | Task information/ observations/reasoning | Certainty Score (1-5) | Controllability Score (1-5) |
|---|---|---|---|---|---|---|
| 1 | VE1 | 1.0 Gain Leadership Support for Function to Process Excellence | | Four of the five main stakeholders are outside the supply chain (marketing, finance, purchasing, customer service, supply chain): Initiative is being driven by supply chain function | 2 | 3 |
| 2 | VE1 | 1.0 Master Implementation Plan | | Ensuring stakeholder participation, time commitment, and alignment | 4 | 3 |
| 3 | VE1 | 1.1.1 Define RMTC MET Charter | 1, 2 | MET definition is required across many Business units & geographies, Availability of existing detailed process documentation suspect, Business buy in on the evolved MET suspect | 2 | 2 |
| 4 | VE1 | 1.1.2 Prototyping Charter | 3, 31 | Selection of a BU where there is buy in, acceptability, flexibility to adapt to change and a strong measurement of baseline performance | 2 | 3 |
| 5 | VE1 | 1.2 RM2C Work Process Enabling Technology | NEA | Different BU, Geography will have different enabling systems, information gaps may exist, Different levels/ versions of | 3 | 3 |

TABLE 1-continued

| Charter/ Task ID | Vision Element | Charter/ Task Name | Dependency | Task information/ observations/reasoning | Certainty Score (1-5) | Controllability Score (1-5) |
|---|---|---|---|---|---|---|
| 6 | VE1 | 1.2.1 Define RMTC Value Proposition | 3 | technology adoption, High dependency on NEA program. Baseline performance of RMTC merics by Business unit required to establish value proposition, current KPIs do not support end to end process view, they are more transactional in nature Variations by Business units & JVs | 2 | 5 |
| 7 | VE1 | 1.2.2 Define RMTC Service Offerings | 3, 6 | Detailed analysis of Current business processes & business models required (Core vs Custom processes) | 2 | 5 |
| 8 | VE1 | 1.3 Establishing KPI's for RMTC process | 7 | Leveraging standard models (SCOR), Common definition & buy in on KPIs | 4 | 3 |
| 9 | VE1 | 1.4 Enabling Service Management Capability for RMTC | 3, 6, 7 | End to end RMTC is a new concept, How will the services be rendered, priced, measured & monitored | 2 | 3 |
| 10 | VE1 | 1.4.1 BPSC Mindset | | Decentralized model, alignment of service teams by mode of transportation. Both these could meet organizational resistance Cross training | 3 | 2 |

In one implementation, the scoring module 118 may further compute a certainty index and a controllability index for each task by consolidating certainty scores and controllability scores of one or more corresponding task information, respectively. In an example, a task $P_i$ may include $m_i$ number of task information. In the present example, the scoring module 118 may allot certainty scores to each task information of a task $P_i$ as $Cr_{j,i}$. Similarly, the scoring module 118 may allot controllability scores to each task information of the task $P_i$ as $Ct_{j,i}$. Further, the scoring module 118 may compute a certainty index and a controllability index for the task $P_i$ by consolidating the certainty scores and the controllability scores of the one or more task information as follows:

The certainty index for project $P_i$ is given by, $$Cr_i = (\Sigma_{j=1}^{m_i} Cr_{j,i})/m_i \quad (1)$$

The controllability index for project $P_i$ is given by, $$Ct_i = (\Sigma_{j=1}^{m_i} Ct_{j,i})/m_i \quad (2)$$

Further, Table 2 illustrates an example of computation of certainty indices and controllability indices for the plurality of tasks. It may be noted that Table 2 provides a better understanding and clarity of the present subject matter and therefore, should not be construed as limiting.

TABLE 2

| Charter/ Task ID | Charter/Task Name | Vision Element | Certainty Index | Controllability Index |
|---|---|---|---|---|
| 1 | 1.0 Gain Leadership Support for Function to Process Excellence | VE1 | 3.00 | 3.00 |
| 2 | 1.0 Master Implementation Plan.doc | VE1 | 3.50 | 3.50 |
| 3 | 1.1.1 Define RMTC MET Charter.doc | VE1 | 2.00 | 2.00 |
| 4 | 1.1.2 Prototyping Charter Template.doc | VE1 | 2.00 | 3.00 |
| 5 | 1.2 RM2C Work Process Enabling Technology.doc | VE1 | 3.00 | 3.00 |

TABLE 2-continued

| Charter/ Task ID | Charter/Task Name | Vision Element | Certainty Index | Controllability Index |
|---|---|---|---|---|
| 6 | 1.2.1 Define RMTC Value Proposition Template.doc | VE1 | 2.00 | 5.00 |
| 7 | 1.2.2 Define RMTC Service Offerings Charter Template.doc | VE1 | 2.00 | 5.00 |
| 8 | 1.3 Establishing KPI's for RMTC process.doc | VE1 | 4.00 | 3.00 |
| 9 | 1.4 Enabling Service Management Capability for RMTC.doc | VE1 | 2.00 | 3.00 |
| 10 | 1.4.1 BPSC Mindset.doc | VE1 | 3.00 | 2.00 |

In one implementation, the scoring module 118 may compute the certainty index and the controllability index of a task as a weighted average of certainty scores and controllability scores of corresponding task information, instead of computing a simple average as described above.

Once the certainty and controllability index are generated, the clustering module 120 may generate a graph, also referred to as certainty-controllability index chart, with certainty indices being plotted on abscissa, i.e., X-axis, and controllability indices being plotted on ordinate, i.e., Y-axis. Based on the corresponding certainty indices and the controllability indices, the clustering module 120 may plot each of the plurality of tasks may on the graph. In one implementation, the clustering module 120 may generate multiple clusters for distributing the plurality of tasks based on the certainty indices and the controllability indices. In an example, the clustering module 120 may generate the multiple clusters by using automated techniques, such as K-means clustering.

In an implementation, the clustering module 120 may distribute the plurality of tasks into quadrants of the graph based on threshold values defined for the controllability indices and the certainty indices of the plurality of tasks. In an example, an administrator may define the threshold values to distribute the plurality of tasks into different quadrants. In another example, the threshold values may be defined by the clustering module 120 using automated algorithms, such as K-means clustering. In the present example, the clustering module 120 may define a threshold value for certainty indices as $T_{Cr}$ and a threshold value for controllability indices as $T_{Ct}$.

In case a certainty index of a task is greater than a threshold value for the certainty indices, i.e., $Cr_i \geq T_{Cr}$, the clustering module 120 may allot a certainty code "Certainty=1" to the task. Otherwise, the clustering module 120 may allot a certainty code "Certainty=0" to the task. Similarly, in case a controllability index of a task is greater than a threshold value for the controllability indices, i.e., $Ct_i \geq T_{Ct}$, the clustering module 120 may allot a controllability code "Controllability=1" to the task. Otherwise, the clustering module 120 may allot a controllability code "Controllability=0" to the task.

In an example, Quadrant I may include one or more tasks with high certainty indices and high controllability indices. Quadrant II may include one or more tasks with high controllability indices and low certainty indices. Further, Quadrant III may include one or more tasks with low controllability indices and high certainty indices. Also, Quadrant IV may include one or more tasks with low certainty indices and low controllability indices.

Table 3 depicts a brief description of the four quadrants, in accordance with an implementation of the present subject matter. It may be understood that Table 3 provides a better understanding and clarity of the present subject matter and therefore, should not be construed as limiting.

TABLE 3

| Certainty Code | Controllability Code | Allocated Quadrant |
|---|---|---|
| 1 | 1 | I |
| 0 | 1 | II |
| 1 | 0 | III |
| 0 | 0 | IV |

In addition, the sequencing module 122 may generate a high level sequence of the execution of the plurality of tasks based on the characteristics of the four quadrants as formed. Table 4 illustrates the high level sequence, in accordance with an implementation of the present subject matter. The table 4 is provided for providing a better understanding and clarity of the present subject matter and therefore, should not be construed as limiting.

TABLE 4

| Allocated Quadrant | Planning Sequence | Sequencing Logic |
|---|---|---|
| I | 1 | The tasks in this quadrant are certain and controllable The task in this quadrant are planned to be executed first in the project as the information necessary to execute the tasks is available and there are adequate number of factors available to execute the tasks. |
| II | 2 | The tasks in this quadrant are uncertain but are controllable While there is information deficiency (uncertainty) around the tasks, the degree of controllability is high so the tasks are chosen next for execution |
| III | 3 | The tasks in this quadrant are certain but are uncontrollable While the information availability (or certainty) is high there is control deficiency (uncontrollable) around the tasks so the tasks are planned for execution after the tasks in the quadrant II |
| IV | 4 | The tasks in this quadrant are uncertain and uncontrollable This is the worst situation possible so the tasks in this quadrant are chosen last for execution hoping that there would be more information available around them and/or higher control available once other tasks (quadrants I to III) are completed |

In an example, the sequencing module 122 may generate the sequence on the basis that a task being controllable is always in a better situation than being certain as ability to gather information and make decisions is better in the case of high controllability indices. Further, the possibility of improving information availability, i.e., certainty, is also better if the task possesses high degree of controllability. Also, for the same values of controllability index, it is always better to possess high value of certainty (information availability).

In one implementation, following the allocation of the plurality of tasks into the four quadrants based on the sequence of execution, the sequencing module 122 may identify relationships among the plurality of tasks. For example, the relationships may indicate that a task $P_8$ may be started following the completion of a task $P_1$. Further, a task $P_4$ and a task $P_{11}$ may be started once the task $P_8$ is completed. Similarly, a task $P_{12}$ may be started once a task $P_2$ is completed. The sequencing module 122 may utilize such relationships in order to shuffle the plurality of tasks among the quadrants. In one implementation, the shuffling of the plurality of tasks among the quadrants may be performed without modifying the controllability indices and the certainty indices of the plurality of tasks.

Once the relationships between different tasks are established, the sequencing module 122 may determine a sequence of execution of the plurality of tasks. In an example, if task T is dependent upon inputs from both tasks X and Y, start of task T happens after both tasks X and Y are finished. Considering another example where another task S may depend upon completion of the task X, and X may be finished before Y. In such an example, the task S may be started immediately after X is finished allowing possibly run Y and S in parallel. Accordingly, the relationships between different tasks sketch out the parallelism and orderable nature of tasks.

Following the redistribution of the tasks among the quadrants, within each quadrant, the sequencing module 122 may generate a sequence for execution of tasks based on the corresponding controllability indices and the certainty indices. In an example, the sequencing module 122 may store the sequence of execution of the tasks as sequence data 128. In one implementation, the sequence can be generated based on a descending order of $Ct_i$, i.e., controllability indices. Further, for each value of $Ct_i$, the tasks can further be sequenced based on descending order of $Cr_i$, i.e., certainty indices. The sequencing module 122 may generate a final sequence of execution of the plurality of tasks by consolidating the sequence of execution of the tasks from different quadrants.

Table 5 illustrates an example of a final sequence for execution of the plurality of tasks of the project, in accordance with an implementation of the present subject matter. It may be noted that table 5 provides a better understanding and clarity of the present subject matter and therefore, should not be construed as limiting.

TABLE 5

| Program Execution Sequence | Charter ID | Charter Name | Vision Element | Certainty Index | Controllability Index | Certain Code | Control Code | Sequence |
|---|---|---|---|---|---|---|---|---|
| 1 | 34 | 4.2 BPM Implementation Strategy | VE4 | 5.00 | 5.00 | 1 | 1 | Q1 |
| 2 | 17 | 2.2.2 Leadership Principals for Service Provider.doc | VE2 | 4.00 | 5.00 | 1 | 1 | Q1 |
| 3 | 33 | 4.1.2 SAP Solution Manager BPM Emerging Technology Assessment | VE4 | 4.00 | 5.00 | 1 | 1 | Q1 |
| 4 | 22 | 3.1 and 3.2 Role Descriptions.doc | VE3 | 3.33 | 4.67 | 1 | 1 | Q1 |
| 5 | 15 | 2.1_RMTC Employee Communication Strategy.doc | VE2 | 3.50 | 4.50 | 1 | 1 | Q1 |
| 6 | 18 | 2.3 Org Culture - Training Charter.doc | VE2 | 3.33 | 4.33 | 1 | 1 | Q1 |
| 7 | 12 | 2.1 Communication Strategy and Plan.doc | VE2 | 3.00 | 4.33 | 1 | 1 | Q1 |
| 8 | 29 | 4.1 BPM Accelerators for RMTC | VE4 | 4.00 | 4.00 | 1 | 1 | Q1 |
| 9 | 13 | 2.1 Org Culture - Case for Change Charter.doc | VE2 | 3.00 | 4.00 | 1 | 1 | Q1 |
| 10 | 11 | 2.0 RMTC Training Program Charter.doc | VE2 | 3.00 | 3.67 | 1 | 1 | Q1 |

Accordingly, the scheduling assistance system 102 facilitates in computing controllability indices and certainty indices to various tasks of a project in an automated manner. The scheduling assistance system 102 reduces the time and resources involved in scheduling the tasks of the project.

Further, as the scheduling assistance system 102 takes into consideration the relationships among the plurality of tasks for generating a final sequence of execution of the tasks in the project, the final sequence thus generated is accurate.

Figure 2:
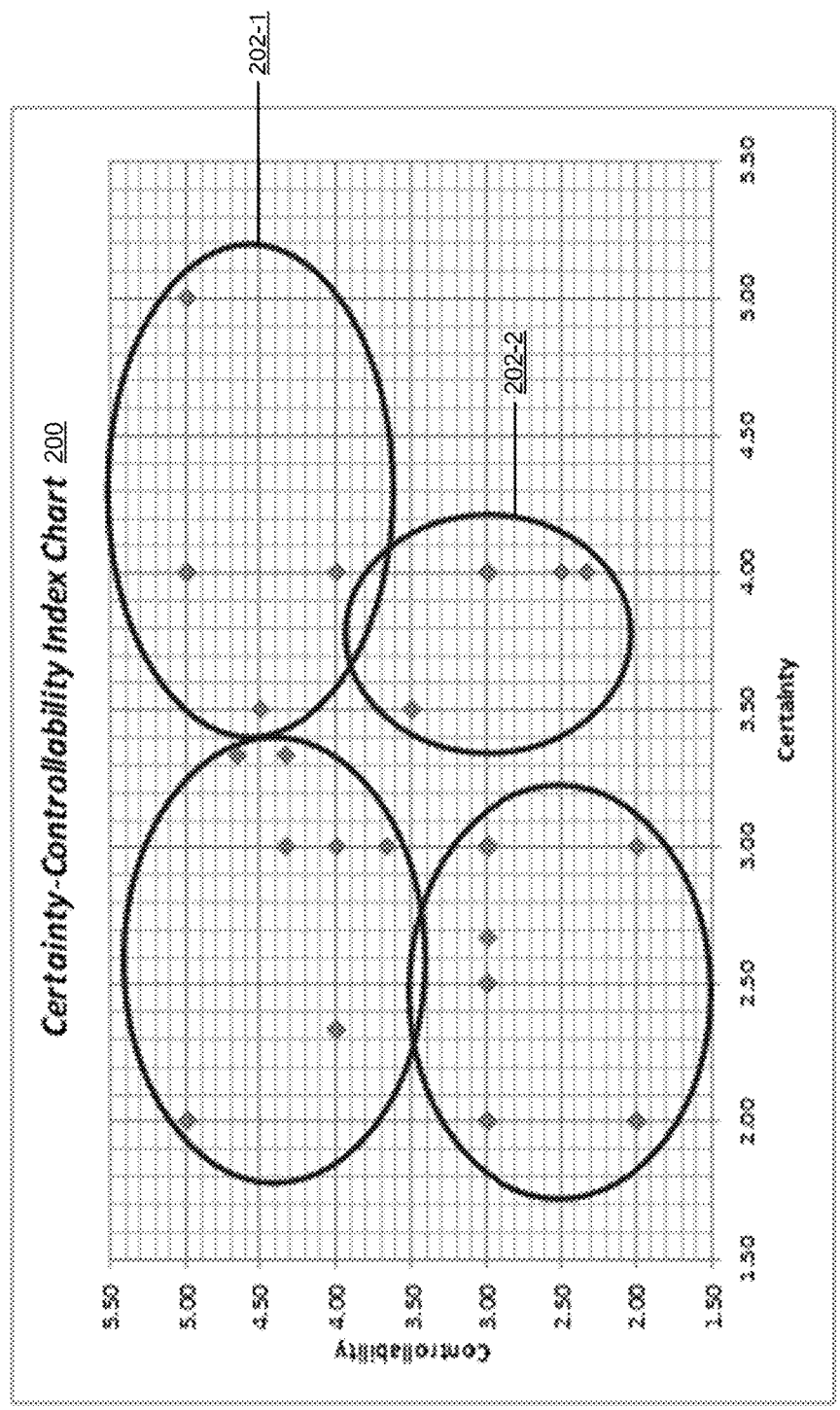
FIG. 2 illustrates an example of clustering of tasks of the project in a certainty-controllability index chart, in accordance with an embodiment of the present subject matter.

FIG. 2 illustrates an example of clustering of tasks of the project in a certainty-controllability index chart 200, in accordance with an embodiment of the present subject matter. The certainty-controllability index may be understood as a graph for plotting the plurality of tasks based on corresponding certainty indices and controllability indices. In an implementation, the certainty-controllability index chart 200 may include certainty indices being plotted as X-axis and controllability indices being plotted on Y-axis. In an example, the clustering module 120 may plot the plurality of tasks in the certainty-controllability index chart 200 based on the certainty indices and the controllability indices. Thereafter, the clustering module 120 may generate clusters 202-1 and 202-2 for the plurality of tasks plotted on the certainty-controllability index chart 200. In an example, the clustering module 120 may generate the clusters based on the threshold values that may be determined for the certainty indices and the controllability indices.

Figure 3:
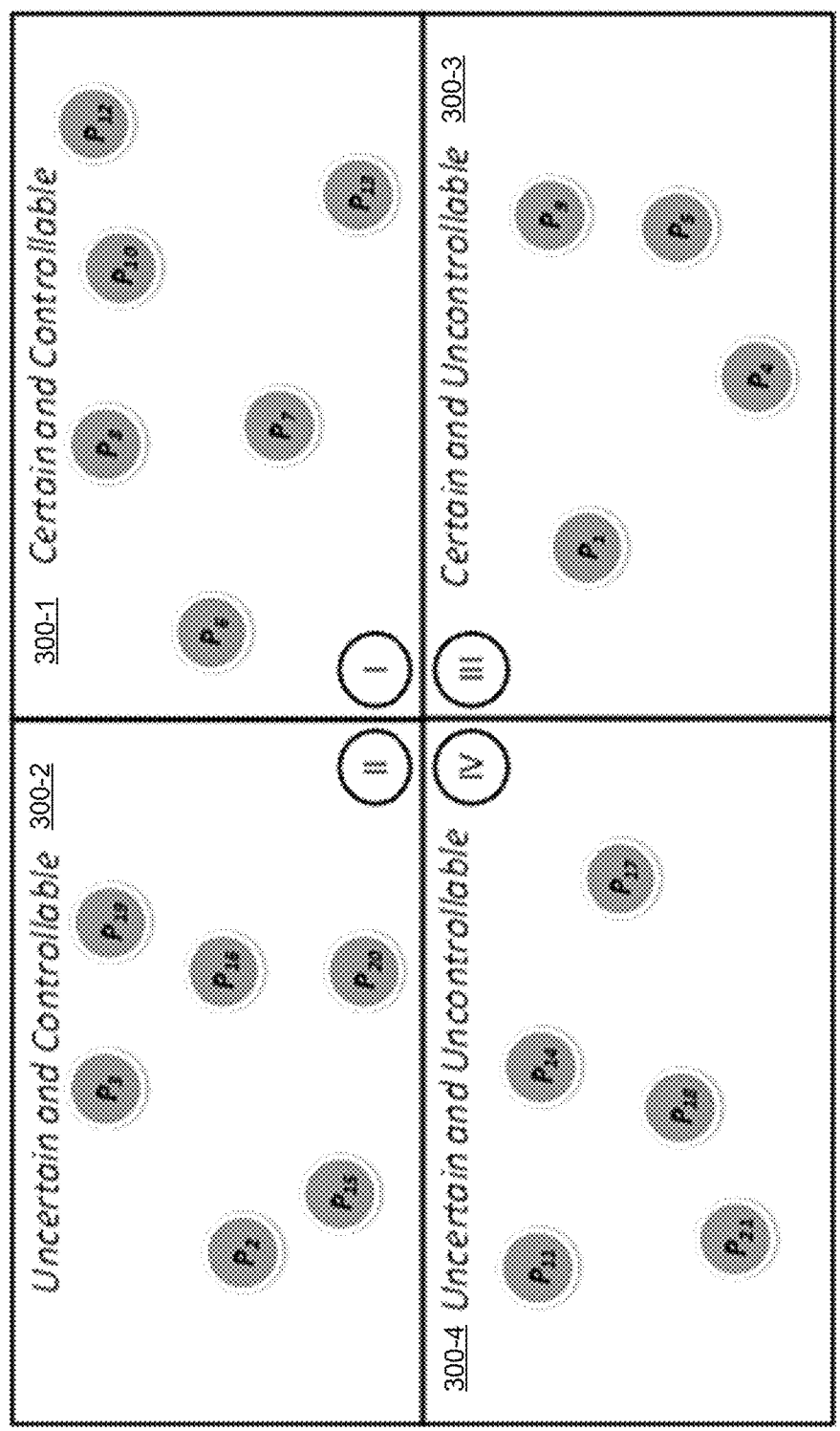
FIG. 3 illustrates allocation of the tasks to multiple quadrants, in accordance with an embodiment of the present subject matter.

FIG. 3 illustrates allocation of the tasks to multiple quadrants 300, in accordance with an embodiment of the present subject matter. In an implementation, the clustering module 120 may distribute the tasks into different quadrants 300 based on a threshold value. For example, Quadrant I 300-1 may include one or more tasks with high certainty indices and high controllability indices. Therefore, if a task is allotted to the Quadrant I 300-1, it would be understood that an adequate amount of information for the execution of the task is available. Further, the tasks in Quadrant I 300-1 indicate that there is sufficient number of factors available to guide or control the task towards an expected outcome. Accordingly, the tasks allotted in Quadrant I 300-1 are considered as certain and controllable.

Likewise, Quadrant II 300-2 may include one or more tasks with high controllability indices and low certainty indices. Therefore, if a task is allotted to the Quadrant II 300-2, it would be understood that the amount of information available for executing the task is inadequate. However, for tasks falling under Quadrant II 300-2, there is adequate number of factors available to control or guide the execution of the task towards an expected outcome. Therefore, the tasks allotted to Quadrant II 300-2 are considered as uncertain yet controllable.

Further, a Quadrant III 300-3 may include one or more tasks with low controllability indices and high certainty indices. Therefore, if a task is allotted to the Quadrant III 300-3, it would be understood that an adequate amount of information is available for executing the task. However, there is inadequate number of factors available to control or guide the execution of the task towards an expected outcome. Therefore, the tasks allotted to the Quadrant III 300-3 are considered as certain and uncontrollable.

Also, a Quadrant IV 300-4 may include one or more tasks with low certainty indices and low controllability indices. Therefore, if a task is allotted to the Quadrant IV 300-4, then it would be understood that an amount of information available for executing the task is inadequate. Similarly, the number of factors available to control the execution of the task towards an expected outcome is also not adequate. Therefore, the tasks allotted to the Quadrant IV 300-4 are considered as uncertain as well as uncontrollable.

Figure 4:
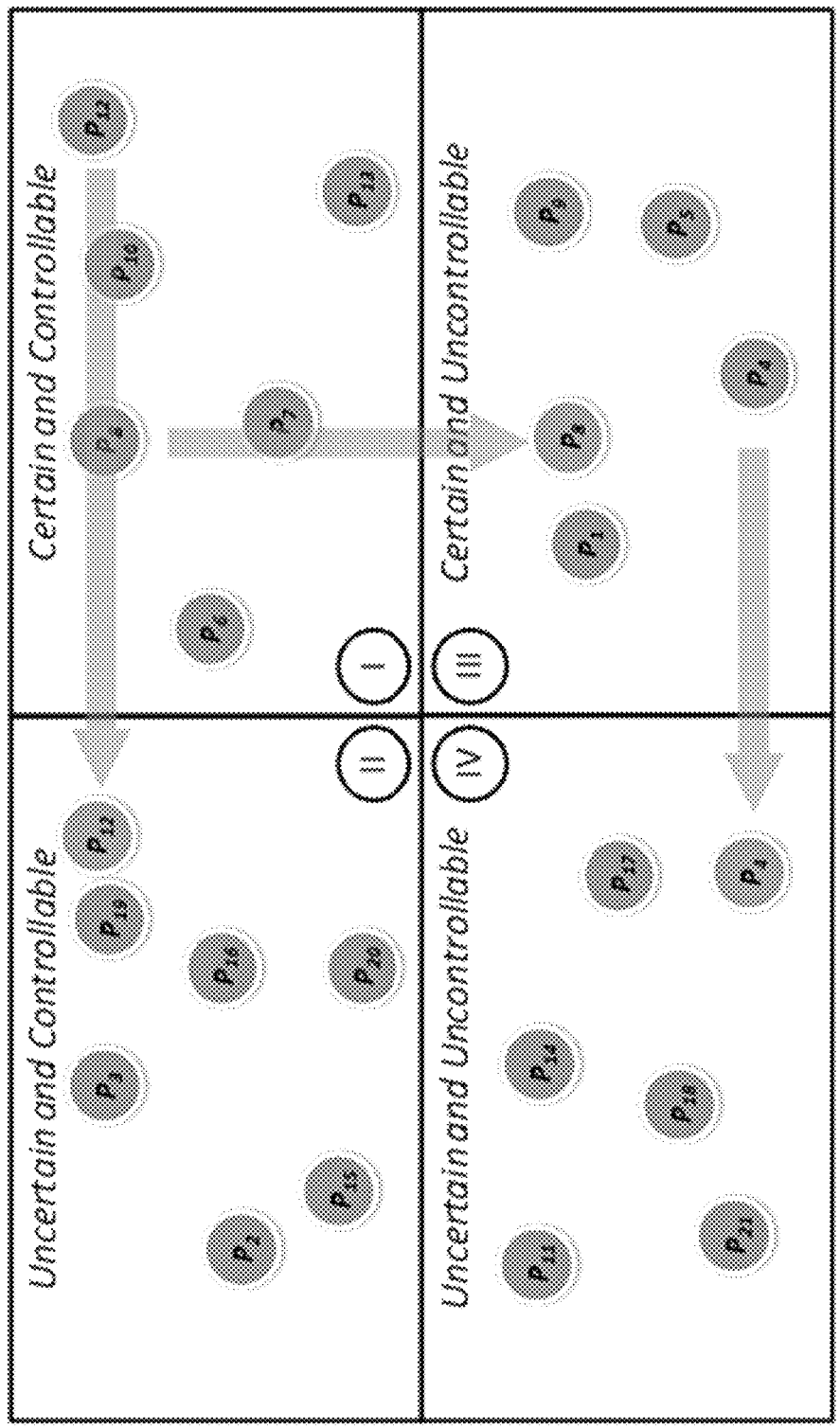
FIG. 4 illustrates an example of shuffling of the tasks among the quadrants, in accordance with an embodiment of the present subject matter.

FIG. 4 illustrates an example of shuffling of the tasks among the quadrants, in accordance with an embodiment of the present subject matter. In an implementation, the sequencing module 122 may, based on the relations between different tasks of the project, shuffle the tasks among the four quadrants 300. For example, if any two tasks are related to each other, those tasks will be moved to same Quadrant. It may be noted that the relationships among the plurality of tasks may be identified based on the hard dependencies. Accordingly, the sequencing module 122 may move the tasks based on their relationships so as to generate a final sequence of execution of the tasks in the project. In the present implementation, the sequencing module 122 may generate the final sequence of the tasks based on the corresponding controllability and certainty indices.

As may be seen from FIG. 4, task $P_{12}$ is moved from Quadrant I 300-1 to Quadrant II 300-2. Likewise, task $P_8$ is moved from Quadrant I 300-1 to Quadrant III 300-3 and task $P_4$ is moved from Quadrant III 300-3 to Quadrant IV 300-4. It may be noted that the sequencing module 122 may shuffle the tasks between the different Quadrants, based on parameters other than the relationship between the tasks. The parameters may include, but are not limited to, time taken for completion of a particular task, and the like. Once shuffled, the sequencing module 122 may generate a final sequence of execution of the tasks within each Quadrant. In an example, the sequencing module 122 may generate a consolidated sequence of execution of the tasks for the completion of the project.

Figure 5:
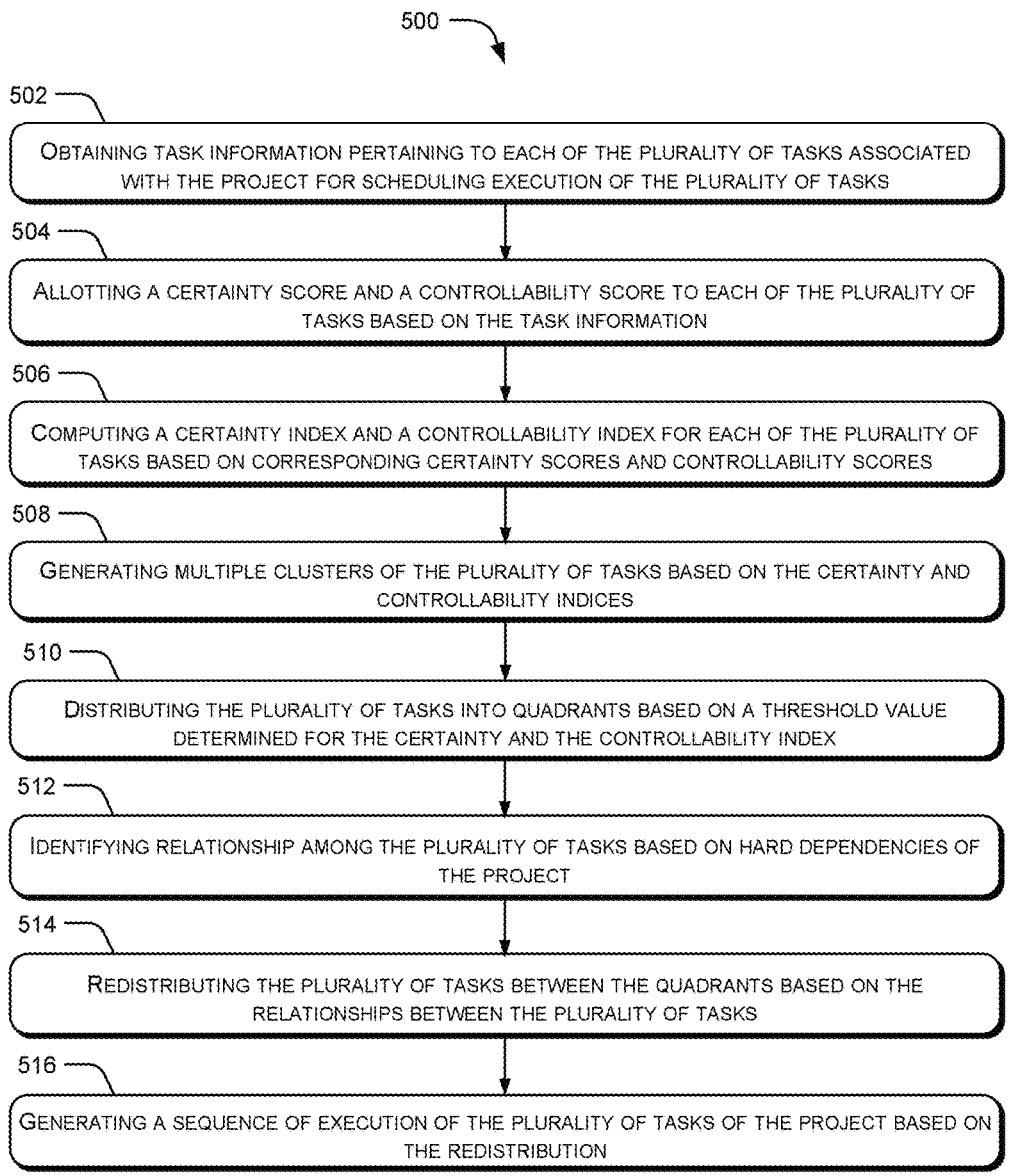
FIG. 5 illustrates a method for providing task scheduling assistance for projects, in accordance with an embodiment of the present subject matter.

FIG. 5 illustrates a method 500 for providing task scheduling assistance for projects, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method(s) are described is not intended to be construed as a limitation, and any number of the described method blocks can be combined in any order to implement the method 500, or an alternative method. Additionally, individual blocks may be deleted from the methods without departing from the spirit and scope of the subject matter described herein. Furthermore, the method 500 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

Referring to FIG. 5, at block 502, the method 500 may include obtaining information pertaining to each of a plurality of tasks associated with a project for scheduling execution of the plurality of tasks. In an implementation, the scoring module 118 may obtain the information pertaining to the plurality of tasks. In an example, the information may be obtained from the memory 112 of the scheduling assistance system 102.

At block 504, the method 500 may include allotting a certainty score and a controllability score to each of the plurality of tasks based on the task information. In an implementation, the scoring module 118 may allot the certainty score and the controllability score to each of the plurality of tasks.

At block 506, the method 500 may include computing a certainty index and a controllability index for each of the plurality of tasks based on corresponding certainty scores and the controllability scores. In an implementation, the scoring module 118 may compute the certainty and controllability indices based on the certainty and controllability scores.

Further, at block 508, the method 500 may include generating multiple clusters of the plurality of tasks based on the certainty and controllability indices. In an implementation, the clustering module 120 may generate a certainty-controllability index chart for the plurality of tasks. Further, the clustering module 120 may generate multiple clusters of the plurality of tasks based on the certainty and controllability indices.

At block 510, the method 500 may include distributing the plurality of tasks into quadrants based on a threshold value determined for the certainty index and the controllability index. In an implementation, the clustering module 120 may distribute the plurality of tasks into quadrants based on the threshold value. In an example, the threshold value is defined by an administrator.

At block 512, the method 500 may include identifying relationships among the plurality of tasks based on hard dependencies of the project. In an implementation, the sequencing module 122 may identify the relationships among the plurality of tasks. In an example, the relationships are identified based on the hard dependencies of the project. The hard dependencies may be indicative of a dependency, when nature of the work itself dictates an order or sequence in which the tasks should be performed. For example, the hard dependencies may incorporate physical or infrastructure factors, such as availability of a specific equipment or policy adherence, associated with the project.

At block 514, the method 500 may include redistributing the plurality of tasks between the quadrants based on the relationships between the plurality of tasks. In an implementation, the sequencing module 122 may redistribute the plurality of tasks between the quadrants based on the relationships between the plurality of tasks.

In addition, at block 516, the method 500 may include generating a sequence of execution of the plurality of tasks of the project based on the redistribution. In an implementation, the sequencing module 122 may generate a sequence of execution of the plurality of tasks of the project based on the redistribution.

Although implementations of a method for providing task scheduling assistance for project have been described in language specific to structural features and/or methods, it is to be understood that the present subject matter is not necessarily limited to the specific features or methods described.

We claim:

1. A computer-implemented method for providing assistance in scheduling a plurality of tasks pertaining to a project, the method comprising:

obtaining, by a processor, information pertaining to each of the plurality of tasks associated with the project for scheduling execution of the plurality of tasks from a memory and scan libraries of routine or documents pertaining to an earlier project and obtain the task information pertaining to the plurality of tasks, wherein the memory tracks the plurality of tasks performed during the earlier project;

computing, by the processor, a certainty index and a controllability index for each of the plurality of tasks, wherein the certainty index and the controllability index is computed based on corresponding certainty scores and controllability scores determined for each of the plurality of tasks, wherein the certainty scores correspond to amount of details available pertaining to execution of the task based on the task information, and the controllability scores correspond to factors that controls the task based on the task information for guiding the project towards an expected outcome;

distributing, by the processor, the plurality of tasks into quadrants generated based on a threshold value determined for the certainty index and the controllability index, wherein the processor maintains the threshold value as fixed for the certainty index and varies the threshold value for the controllability index with the life of the project, wherein the threshold value is suggested based on calibration of the threshold value for interfacing tasks by a user on a user device;

identifying, by the processor, relationships among the plurality of tasks based on hard dependencies of the project, wherein the hard dependencies incorporate physical factors such as availability of a specific equipment and correspond to dependencies when nature of the project demands a sequence of executing the tasks distributed in the quadrants;

redistributing, by the processor, the plurality of tasks within the quadrants based on the relationships identified between the plurality of tasks;

generating, by the processor, a sequence of execution of each of the plurality of tasks of the project upon identifying the relationships among the plurality of tasks, wherein the generating is based on the certainty index and the controllability index; and revising the sequence of execution of each of the plurality of tasks upon ascertaining inclusion of new tasks in the project.

2. The computer-implemented method as claimed in claim 1 further comprising allotting, by the processor, a controllability score and a certainty score for each of the plurality of tasks based on the task information.

3. The computer-implemented method as claimed in claim 1 further comprising generating, by the processor, a certainty-controllability index chart for the plurality of tasks, wherein the certainty-controllability index chart is based on the certainty index and the controllability index computed for each of the plurality of tasks.

4. The computer-implemented method as claimed in claim 3 further comprising generating, by the processor, one or more clusters of the plurality of tasks on the certainty-controllability index chart, the one or more clusters is generated based on the controllability indices and certainty indices associated with the plurality of tasks.

5. A scheduling assistance system for providing assistance in scheduling a plurality of tasks pertaining to a project, the scheduling assistance system coupled to a user device-comprises:

a processor;

a scoring module, executable by the processor, that obtains task information pertaining to each of a plurality of tasks associated with the project for scheduling execution of the plurality of tasks from a memory, and scan libraries of routine or documents pertaining to an earlier project and obtain the task information pertaining to the plurality of tasks, wherein the memory tracks the plurality of tasks performed during the earlier project;

the scoring module, executable by the processor, that computes a certainty index and a controllability index for each of the plurality of tasks, wherein the certainty index and the controllability index is computed based on corresponding certainty scores and controllability scores determined for each of the plurality of tasks, wherein the certainty scores correspond to amount of details available pertaining to execution of the task based on the task information, and the controllability scores correspond to factors that control the task based on the task information for guiding the project towards an expected outcome;

a clustering module, executable by the processor, to:

generate multiple clusters of the plurality of tasks based on the certainty index and the controllability index of each of the plurality of tasks; and distribute each of the plurality of tasks into quadrants generated based on a threshold value determined for the certainty index and the controllability index, wherein the clustering module maintains the threshold value as fixed for the certainty index and varies the threshold value for the controllability index with the life of the project, wherein the threshold value is recalibrated for interfacing tasks by a user on the user device and accordingly the scheduling assistance system suggests the threshold value, and also displays the multiple clusters on the user device; and a sequencing module, executable by the processor, to:

identify relationships among the plurality of tasks based on hard dependencies of the project, wherein the hard dependencies incorporate physical factors such as availability of a specific equipment and correspond to dependencies when nature of the project demands a sequence of executing the tasks distributed in the quadrants;

redistribute the plurality of tasks within the quadrants, based on the relationships identified between the plurality of tasks;

generate a sequence of execution of each of the plurality of tasks of the project, wherein the sequence is generated based on the certainty index and the controllability index; and revise the sequence of execution of each of the plurality of tasks upon ascertaining inclusion of new tasks in the project.

6. The scheduling assistance system as claimed in claim 5, wherein the clustering module allots certainty code and a controllability code to each of the plurality of tasks based on the threshold value defined by the clustering module.

7. The scheduling assistance system as claimed in claim 5, wherein the clustering module generates a certainty-controllability index chart, and wherein the multiple clusters are generated when the plurality of tasks are plotted on the certainty-controllability index chart.

8. A non-transitory computer-readable medium having embodied thereon a computer program for executing a method for providing assistance in scheduling a plurality of tasks pertaining to a project comprising:

obtaining, by a processor, task information pertaining to each of the plurality of tasks associated with the project for scheduling execution of the plurality of tasks from a memory, and scan libraries of routine or documents pertaining to an earlier project and obtain the task information pertaining to the plurality of tasks, wherein the memory tracks the plurality of tasks performed during the earlier project;

computing, by the processor, a certainty index and a controllability index for each of the plurality of tasks, wherein the certainty index and the controllability index is computed based on corresponding certainty scores and controllability scores determined for each of the plurality of tasks, wherein certainty scores correspond to amount of details available pertaining to execution of the task based on the task information, and the controllability scores correspond to factors that control the task based on the task information for guiding the project towards an expected outcome;

distributing, by the processor, the plurality of tasks into quadrants generating based on a threshold value determined for the certainty index and the controllability index, wherein the processor maintains the threshold value as fixed for the certainty index and varies the threshold value for the controllability index with the life of the project, wherein the threshold value is suggested based on calibration of the threshold value for interfacing tasks by a user on a user device;

identifying, by the processor, relationships among the plurality of tasks based on hard dependencies of the project, wherein the hard dependencies incorporate physical factors such as availability of a specific equipment and correspond to dependencies when nature of the project demands a sequence of executing the tasks distributed in the quadrants;

redistributing, by the processor, the plurality of tasks within the quadrants based on the relationships identified between the plurality of tasks;

generating, by the processor, a sequence of execution of each of the plurality of tasks of the project upon identifying the relationships among the plurality of tasks, wherein the generating is based on the certainty index and the controllability index; and revising, by the processor, the sequence of execution of each of the plurality of tasks upon ascertaining inclusion of new tasks in the project.

* * * * *